United States Patent [19]
Stoten

[11] Patent Number: 6,134,874
[45] Date of Patent: Oct. 24, 2000

[54] INTEGRAL INERTIAL PARTICLE SEPARATOR FOR RADIAL INLET GAS TURBINE ENGINE

[75] Inventor: Michael Donald Stoten, Oakville, Canada

[73] Assignee: Pratt & Whitney Canada Corp., Longueuil, Canada

[21] Appl. No.: 09/088,894

[22] Filed: Jun. 2, 1998

[51] Int. Cl.[7] .............................. F02C 7/047; F02C 7/052
[52] U.S. Cl. .................................... 60/39.092; 60/39.093; 55/306
[58] Field of Search ........................... 60/39.092, 39.093; 55/306; 415/121.2

[56] References Cited

U.S. PATENT DOCUMENTS

| | | |
|---|---|---|
| 3,521,431 | 7/1970 | Connors et al. ..................... 60/39.092 |
| 3,733,814 | 5/1973 | Hull et al. ............................ 60/39.092 |
| 3,766,719 | 10/1973 | McAnally, III . |
| 4,509,962 | 4/1985 | Breitman et al. . |
| 4,592,765 | 6/1986 | Breitman et al. . |
| 5,039,317 | 8/1991 | Thompson et al. . |

FOREIGN PATENT DOCUMENTS

| | | |
|---|---|---|
| 0357173 | 3/1990 | European Pat. Off. . |
| 2095335 | 9/1982 | United Kingdom ................ 60/39.092 |

*Primary Examiner*—Louis J. Casaregola
*Attorney, Agent, or Firm*—Jeffrey W. Astle

[57] ABSTRACT

An integral inertial particle separator with a de-icing feature in the form of a bifurcated radial intake for a gas turbine engine with an outside wall of the radial intake disposed in contact with heated oil from the engine lubrication system. To discharge particle contaminated bypass air flow from the engine, the separator includes an annular bypass manifold in communication with the bypass duct with vacuum created by an exhaust driven jet air pump.

5 Claims, 3 Drawing Sheets

INTEGRAL INERTIAL PARTICLE SEPARATOR FOR RADIAL INLET GAS TURBINE ENGINE

TECHNICAL FIELD

The invention is directed to a bifurcated radial intake modified to include a bypass duct as an integral internal inertial particle separator for removing sand, ice flakes and other damaging particles from the intake air flow under centrifugal force.

BACKGROUND OF THE ART

Inherent in the operation of gas turbine engines for helicopters and aircraft is the possibility of airborne particles which are drawn into the turbine engine. The common problem in operating helicopters is the stirring up of sand clouds by the main rotors when hovering in close proximity to ground surfaces. The extremely high forces and turbulence of air driven by the rotors stirs up enough dust, sand and small pebbles to cause serious damage to helicopter gas turbine engines. Other commonly known problems are caused by hail, ice sheets and birds.

Large foreign particles can be prevented from entering the engine with screens, however, small sand particles are generally dealt with using an external inertial particle separator immediately upstream of the engine intake. Airborne sand particles are removed through centrifugal force in the inertial particle separator. The particle separator generally comprises an external main intake duct which is curved in order to force airborne particles radially outwardly into a bypass duct for discharge from the engine. Of the total airflow drawn into the inertial particle separator, a substantial fraction such as 15–50% forced through the bypass duct together with the centrifugally driven airborne particles. The remaining 50%–85% of the airflow then proceeds to the compressor section with substantially all of the airborne particles removed.

U.S. Pat. Nos. 4,509,962 and 4,592,765 to Breitman et al show two examples of forward mounted axial intake separators. These prior art separators intake particle contaminated air in an axial annular flow path. The intake has a single or double (S-shaped) sharp bend. Airborne particles continue travelling in a straight line while the air flows around the bend or bends. As a result, the particles bounce and deflect against inner and outer walls of the intake into a bypass duct for discharge from the engine. The shape of the inner and outer walls may be parabolic to focus the spray of deflected particles in the desired direction towards the bypass duct.

A significant disadvantage of these prior art separators is the additional space consummed. In effect the forward intake of the engine is extended and the overall length of the engine may be increased. In the case of radial intake engines, the axial extent of the engine is increased with the addition of a prior art particle separator.

Also included in prior art inertial particle separators are mechanically actuated deflector flaps to force the air to make a sharper bend at increased velocity, thereby increasing the centrifugal separation of airborne particles, at the cost of an increased pressure loss to the air delivered to the compressor.

Inertial particle separators of the prior art are commonly included in relatively bulky ducts which are mounted laterally external to the engine in the case of a radial inlet or towards the front of the engine in the case of an axial inlet. Whether mounted externally or forwardly, the prior art external inertial particle separators represent a weight increase and size increase for the engine and nacelle. Particularly in the case of lightweight helicopters, the increase in size and weight can be critical. For example, the external inertial particle separator can result in approximately 5° additional power loss from the engine. To maintain the same output power to the rotors, a larger engine must be provided. The larger engine itself includes a weight and size penalty, in addition to increased fuel consumption.

In the prior art of axial inlet inertial particle separators, heating to prevent blockage by ice forming in the inlet is necessary. This is normally provided by equipping the separator with double walls and circulating hot compressor discharge air between the double walls. The hot air flow is controlled by a shut-off valve. However, the net result is that anti-icing provisions represent a considerable cost, weight and reliability penalty for the engine.

In summary therefore, although external inertial particle separators are successful in removing damaging sand particles from the air intake into an engine, there are significant disadvantages involved in their use.

A further disadvantage of conventional external inertial particle separators is the effort required on the behalf of technical personnel to coordinate the design and maintenance of large external ducts between the engine manufacturer and others involved in helicopter and aircraft production.

It is an object of this invention to substantially reduce the size and weight of an inertial particle separator by incorporating the separator with a radial intake of a gas turbine engine.

It is a further object of this invention to provide a radial intake gas turbine engine which includes a built-in inertial particle separator thereby eliminating the requirement of external duct work and the disadvantages of the prior art.

It is a further object of the invention to provide anti-icing capability in addition to the inertial particle separation function.

DISCLOSURE OF THE INVENTION

The invention provides an integral inertial particle separator in the form of a bifurcated radial intake for a gas turbine engine. Radial intake engines include an arcuate intake duct which draws in air radially from an external plenum and redirects the air flow axially into an annular compressor duct.

By modifying the radial intake duct to include a bypass duct, an integral inertial particle separator is economically provided internally within the engine to remove sand, ice flakes and other damaging particles from the intake air flow. In contrast, external prior art particle separators are often bulky ducts added on to an engine thereby increasing the size, weight and air resistance characteristics of the engine.

The bifurcated axially symmetric radial intake has an inward end in communication with the axial flow compressor duct and an outward end including a peripherally open radial inlet as is conventional. However, the radial intake departs from convention with a discontinuous concave forward surface extending between a forward edge of the inlet and the inner compressor duct wall. The concave forward surface forces air flow into an arcuate path thereby separating relatively heavy particles from the air flow under centrifugal force.

The discontinuity in the radial intake concave forward surface includes a bypass duct downstream of the inlet and a cusp shaped flow separator downstream of the bypass duct, for diverting a bypass air flow into the bypass duct. To discharge particle contaminated bypass air flow from the engine, an annular bypass manifold in communication with the bypass duct and an air pump is included. Air pump means to evacuate the bypass air flow include conventional exhaust driven jet pumps and rotating fans adapted specifically for this purpose.

Further details of the invention and its advantages will be apparent from the detailed description and drawings included below.

BRIEF DESCRIPTION OF THE DRAWINGS

In order that the invention may be readily understood, one preferred embodiment of the invention will be described by way of example, with reference to the accompanying drawings wherein.

DETAILED DESCRIPTION OF PREFERRED EMBODIMENTS

Figure 1:
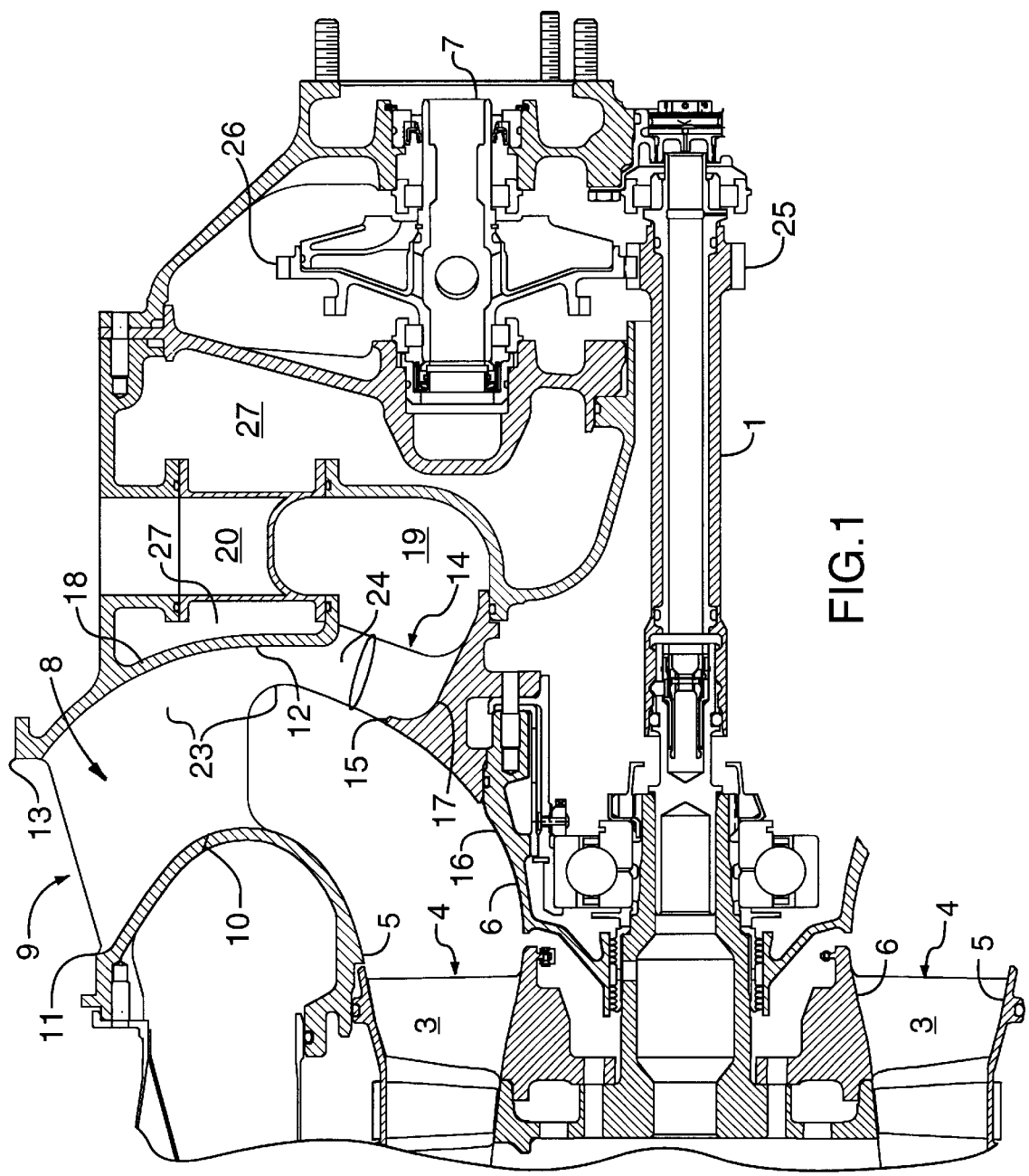
FIG. 1 is an axial cross-sectional view through a modified radial intake and adjacent turbine engine shaft upstream of the compressor section.

FIG. 1 illustrates an axial cross-section through a modified radial intake gas turbine engine. Conventional radial intake gas turbine engines have a longitudinal shaft 1, upon which is mounted a compressor rotor 2 with a peripheral array of compressor blades 3. An annular compressor duct 4 is defined between an outer compressor duct wall 5 and an inner compressor duct wall 6. The foregoing structure of the radially intake gas turbine engine is conventional. A conventional radial intake draws in air from an external plenum (not shown) and redirects the airflow from a radially inward direction to an axially rearward direction through the compressor duct 4.

As illustrated in each of the accompanying drawings, the invention provides an integral inertial particle separator in the radial intake, in the form of a bifurcated radial intake.

Referring to FIG. 1, the bifurcated axially symmetrical radial intake 8 has an inward end in communication with the compressor duct 4 and an outward end with a peripherally open inlet 9. The bifurcated radial intake 8 includes a continuous convex rear surface 10 which extends between a rear edge 11 of the inlet 9 and the outer compressor duct wall 5.

The bifurcated radial intake 8 has a discontinuous concave forward surface 12. The discontinuous concave forward surface 12 extends between the forward edge 13 of the inlet 9 and the inner compressor duct wall 6.

The radial intake forward surface 12 includes a bypass duct 14 downstream of the inlet 9 and a cusp lip 15 as a flow separator downstream of the bypass duct 14 for diverting a bypass airflow into the bypass duct 14. The flow separator lip 15 presents a cusp lip or an apex disposed between a downstream portion 16 of the radial intake forward surface 12 and an adjacent inner surface 17 of the bypass duct 14. It will be appreciated that the positioning of the cusp lip 15 and the relative curvatures of the rear surface 10, upstream portion 18 and downstream portion 16 of the radial intake forward surface 12, will largely be determined by designers to discharge a selected percentage of the total airflow into the bypass duct 14.

Figure 2:
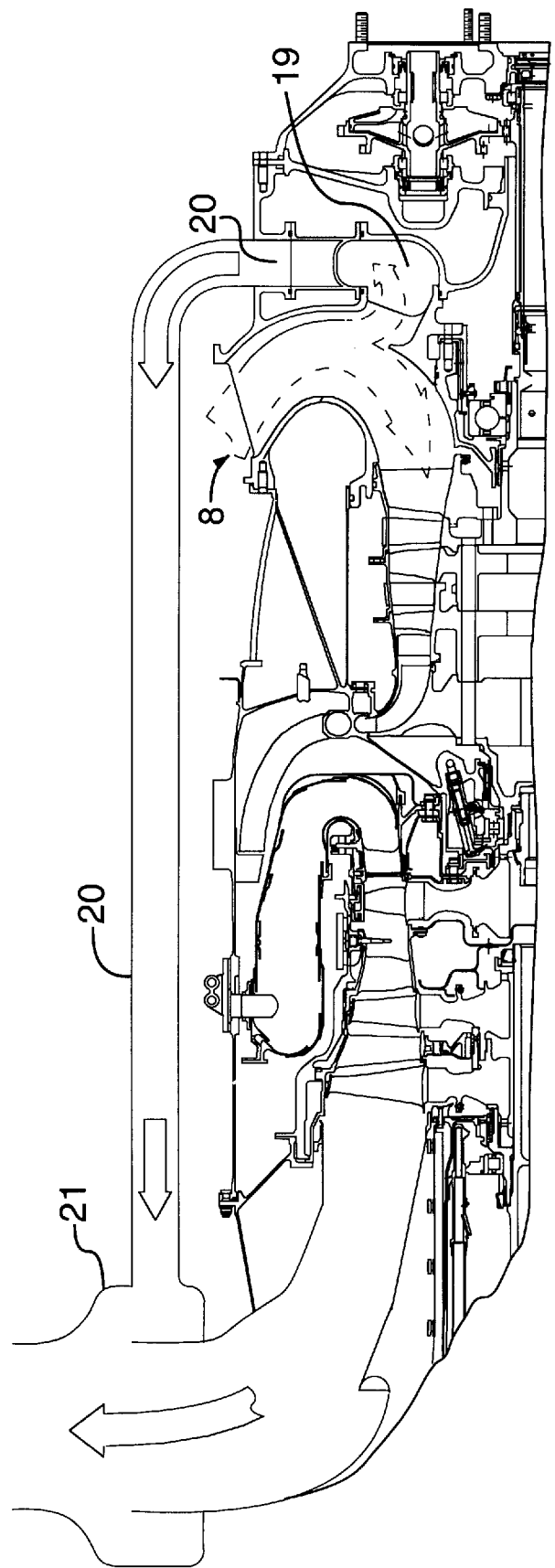
FIG. 2 is an axial cross-section through the entire gas turbine engine showing the air path into the radial intake with the major portion of the intake airflow passing to the compressor blades with a bypass portion of the air containing centrifugally forced airborne particles passing into a bypass duct, a peripheral bypass manifold and then discharged from the engine through discharge conduits (shown schematically) and evacuated by an exhaust driven jet air pump from the engine (also shown schematically)

To discharge the particle contaminated bypass airflow from the engine, the following discharge means are provided in communication with the bypass duct 14. An annular bypass manifold 19 encircles the shaft 1 and collects bypass airflow from the bypass duct 14. Referring to FIGS. 1 and 2, at one location in the circumference of the bypass manifold 19, a discharge conduit 20 evacuates air from the bypass manifold 19 through a conventional exhaust driven jet pump 21 or fan (not shown) to evacuate the particle contaminated air.

As indicated in FIG. 2, the bulk of the intake air passes from the radial intake 8 into the compressor duct 4 after airborne particles are centrifugally forced radially outward into the bypass airflow before discharge from the engine by the bypass jet air pump 21 or fan.

In the preferred embodiment illustrated in FIG. 1, particle separation is enhanced by providing the discontinuous radial intake forward surface 12 with a concave upstream portion 18. Radial ribs or vanes 23 provide structural support across the radial intake 8 and extend downstream to provide support across the bypass duct 14 to the flow separator cusp 15. These ribs 23 are incidental to the inertial particle separator function of the radial intake 8 and may be deleted if alternative structural support is provided.

Further in the embodiment shown in FIG. 1, the shaft 1 includes a gears 25, 26 which drive auxiliary equipment shaft 7. An oil tank 27 used to provide lubrication for the gas turbine engine is partially formed by the upstream radial intake wall 18. The oil tank 27 also surrounds the bypass duct 19 and a portion of the discharge conduit 20 thereby heating these surfaces and obviating the need for separate heating means to de-ice the internal surfaces of these elements. Heating could equally be provided by oil splashing from the gearbox, of which gears 25 and 26 form a part, in the absence of the oil tank.

Figure 3:
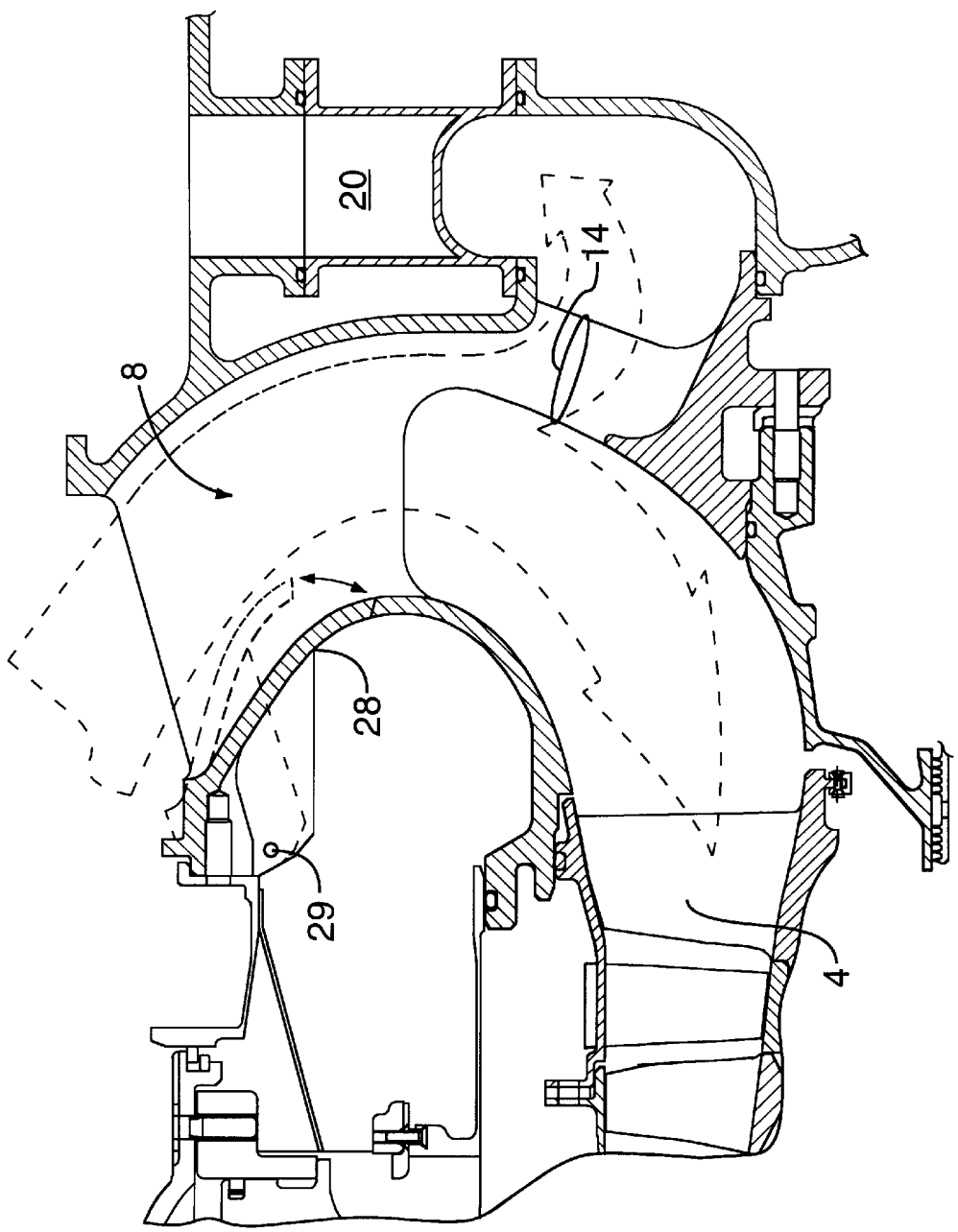
FIG. 3 shows an optional embodiment of the invention further including a hinged deflector flap which may be extended mechanically into the radial intake forcing the air to make a sharper bend at increased velocity, thereby increasing the centrifugal separation of airborne particles.

FIG. 3 illustrates an optional addition to the radial intake 8. In order increase the centrifugal separation of airborne particles, a mechanically actuated deflector flap 28 hinged about pin 29 can be extended into the radial intake 8 by conventional mechanical means (not shown).

Although the above description and accompanying drawings relate to a specific preferred embodiment as presently contemplated by the inventor, it will be understood that the invention in its broad aspect includes mechanical and functional equivalents of the elements described and illustrated.

What is claimed is:

1. In a radial intake gas turbine engine having a longitudinal axis, an annular compressor duct defined between an outer compressor duct wall and an inner compressor duct wall, wherein the improvement comprises:

a bifurcated axially symmetric radial intake with an inward end in communication with the compressor duct and an outward end including a peripherally open inlet, the radial intake having:

a continuous convex rear surface extending between a rear edge of the inlet and the outer compressor duct wall; and a discontinuous concave forward surface extending between a forward edge of the inlet and the inner compressor duct wall, the radial intake forward surface including: a bypass duct downstream of the inlet; and flow separator means, downstream of the bypass duct, for diverting a bypass air flow into the bypass duct;

an annular bypass manifold in communication with the bypass duct;

air pumping means, in communication with the bypass manifold, for evacuating air from the bypass manifold; and radial intake forward surface de-icing means for heating the radial intake forward surface.

2. A bifurcated radial intake according to claim 1 wherein the flow separator means comprise a cusp lip disposed between a downstream portion of the radial intake forward surface and an adjacent inner surface of the bypass duct.

3. A bifurcated radial intake according to claim 1 including bypass manifold de-icing means for heating the bypass manifold.

4. A bifurcated radial intake according to claim 3 wherein the bypass manifold de-icing means comprise means for circulating heated oil over the bypass manifold.

5. A bifurcated radial intake according to claim 4 including radial intake forward surface de-icing means for heating the radial intake forward surface, comprising said means for circulating heated oil in thermal contact with the radial intake forward surface.

* * * * *